Aug. 22, 1944.　　　G. T. SMITH　　　2,356,492
POWER STEERING MECHANISM
Filed Feb. 25, 1941　　　2 Sheets-Sheet 1
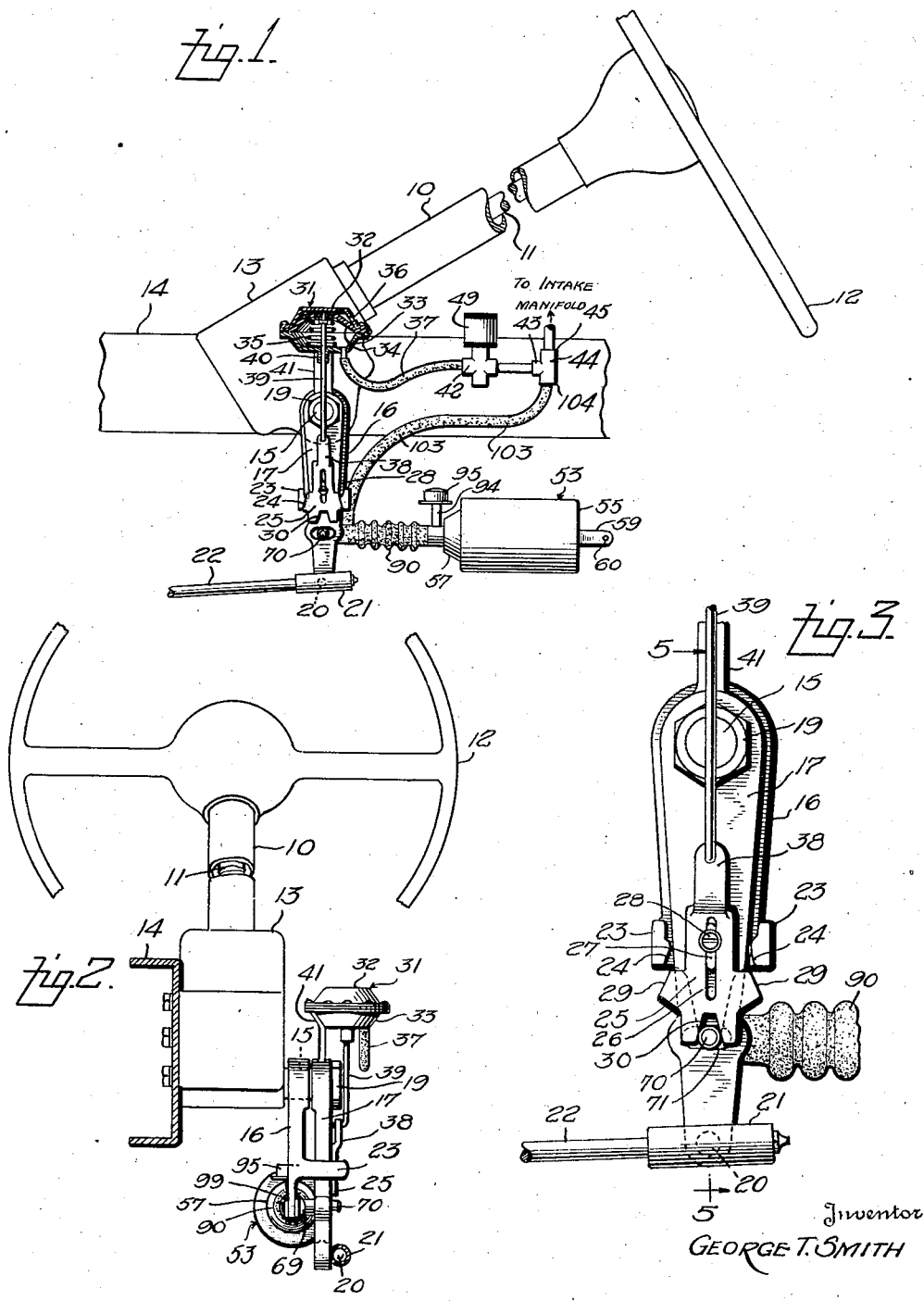
Inventor
GEORGE T. SMITH

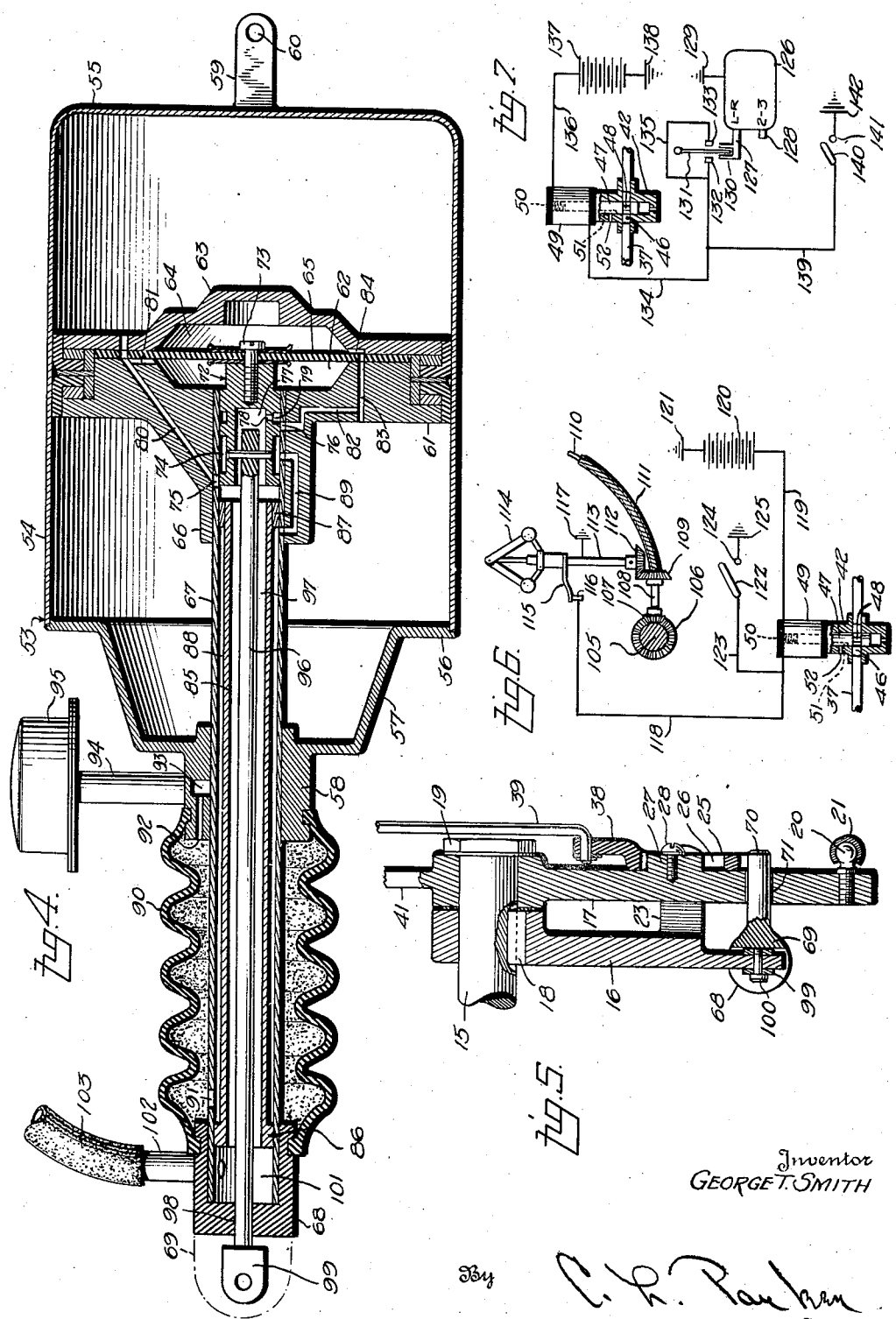

Patented Aug. 22, 1944

2,356,492

UNITED STATES PATENT OFFICE 2,356,492

POWER STEERING MECHANISM

George Tucker Smith, Richmond, Va., assignor to Automatic Shifters, Inc., Richmond, Va., a corporation of Virginia Application February 25, 1941, Serial No. 380,563

39 Claims. (Cl. 180—79.2)

This invention relates to power steering mechanisms for motor vehicles.

As is well known, the gear ratio provided between the steering wheels and the dirigible front wheels of motor vehicles is decided more or less on a compromise basis so as to provide as great a leverage as possible for steering when a car is traveling very slowly without making it necessary for the operator to rotate the wheel excessively when the vehicle is traveling at a reasonable speed, very little steering effort being required under the latter conditions and a relatively small gear ratio being sufficient to enable the operator to easily steer the vehicle. Although the compromise arrangement referred to provides for a relatively high gear ratio, a substantial effort is required for turning the steering wheel when a vehicle is stationary or moving very slowly, for example, when the vehicle is being parked in a limited space or being driven out of a limited parking space. If the gear ratio employed were sufficient to enable an operator to turn the steering wheel with little effort when the vehicle is stationary or moving very slowly, it would require a very substantial turning movement of the steering wheel for a relatively small angle of turning of the front wheels of the vehicle when the vehicle is traveling at a reasonable speed. Conversely, if the gear ratio were designed to reduce the degree of turning of the steering wheel and still permit such turning to be carried out with little effort when the vehicle is underway, the gear ratio would be insufficient to permit the turning of the steering wheel when the vehicle is stationary or moving very slowly.

With the foregoing in mind, an important object of the present invention is to provide a novel type of power mechanism controlled by the steering wheel of a vehicle for turning the front wheels of the vehicle, thus materially reducing the effort required on the part of the operator for a given turning movement of the front wheels of the vehicle under any conditions.

A further object is to provide a novel steering mechanism of the character referred to wherein either power or manual steering may be automatically provided under different predetermined conditions.

A further object is to provide a power steering mechanism wherein power will be automatically employed upon predetermined conditions such as vehicle speed or when the vehicle gear set is in low or reverse gears, and wherein under all conditions other than the predetermined conditions referred to the steering is manually accomplished through the turning of the steering wheel, whereby the turning of the steering wheel requires little effort when the vehicle is stationary or moving slowly, and wherein the gear ratio may be reduced to permit turns to be made when the vehicle is underway without the necessity for the operator's having to turn the steering wheel through substantial movement.

A further object is to provide a novel mechanism for changing back and forth between power and manual steering, the mechanism being extremely simple and positive in operation.

A further object is to provide a differential fluid pressure motor and valve mechanism therefor for effecting the steering of the front wheels of a motor vehicle and to provide novel means for transmitting movement of the steering wheel to the valve mechanism, when power steering is to be effected, and for directly transmitting manual movement of the steering wheel to the steering mechanism when manual steering is to be effected.

A further object is to provide a novel mechanism for changing over from power to manual steering, and to provide novel means for causing the fluid pressure motor to follow-up with respect to parts of the mechanism when manual steering is effected, thus eliminating any drag incident to movement of the piston in the motor when the front wheels are being manually steered.

Other objects and advantages of the invention will become apparent during the course of the following description.

In the drawings I have shown one embodiment of the invention. In this showing—

Figure 1 is a side elevation of a portion of a vehicle steering mechanism, parts being broken away and parts being shown in section, Figure 2 is a front elevation of the same, Figure 3 is an enlarged side elevation of the lever mechanism of the present invention, associated elements being connected thereto and being broken away, Figure 4 is an enlarged central longitudinal sectional view through the steering motor and valve mechanism, Figure 5 is a section on line 5—5 of Figure 3, Figure 6 is a diagrammatic representation of an electrical control system for the mechanism, and, Figure 7 is a similar view showing a modified system.

Referring to Figure 1 the numeral 10 designates a conventional steering column having a steering post 11 therein provided at its upper end with the usual steering wheel 12. At the lower end of the steering column a conventional gear housing 13 is provided and is secured to a stationary portion of the vehicle such as a frame member 14. The gear housing 13 contains any desired type of gear reduction means, such as a worm and pinion or the like (not shown) for mechanically connecting, and reducing the turning ratio, between the steering post 11 and the takeoff shaft 15 of the steering mechanism. These elements are conventional as stated, and form no part per se of the present invention.

Referring to Figures 1, 2, 3 and 5, it will be noted that a pair of lever arms 16 and 17 have their upper ends mounted on the shaft 15. The lever arm 16 is keyed to the shaft 15 as at 18 (Figure 5) and a nut 19 retains the two lever arms in position with respect to the shaft 15. The lower end of the lever 17 is provided with a ball 20 mounted in the usual socket 21 carried by a conventional drag link 22. This drag link transmits movement to the front wheels of the motor vehicle in the usual manner.

The lever arm 16 is provided with a pair of stop pads 23 extending across the plane of the lever 17 and arranged on opposite sides of this lever as shown in Figure 3. Adjacent opposite edges of the lever 17, the stop pads 23 have their inner faces provided with upwardly converging faces 24 for a purpose to be described. The upper limits of the converging faces 24 are spaced apart a distance somewhat greater than the width of the adjacent portion of the lever arm 17 and accordingly, with the parts in the position shown in Figure 3, the lever arm 16 is adapted to partake of limited turning movement on the shaft 15 with relation to the lever arm 17. As will become apparent below, this limited turning movement is utilized for controlling the steering motor to be described, and when manual steering is to be effected, the lever arms 16 and 17 are locked together to operate as a unit in a manner also to be described.

A plate 25 is mounted against the outer face of the lever arm 17 and is vertically slotted as at 26 to receive a rib 27 formed integral with the lever arm 17. A screw 28 retains the plate 25 in the position described. It will be apparent that the plate 25 is free to move longitudinally with respect to the lever arm 17, that is, radially with respect to the axis of the shaft 15, but is fixed against any other movement relative to the lever arm 17. The plate 25 is provided with opposite projections having wedge faces 29 converging upwardly to correspond to the upward convergence of the faces 24 and engageable therewith when the plate 25 is moved upwardly in a manner to be described. When such engagement of the faces 24 and 29 takes place, the lever arms 16 and 17 are locked together for movement as a unit, under which conditions manual steering is effected, as will become apparent. In its lower end, the plate 25 is provided with an upwardly converging recess 30 for a purpose to be described.

Upward and downward movement of the plate 25 is effected by a small fluid pressure motor shown in Figures 1 and 2 and indicated as a whole by the numeral 31. This motor is preferably operated from the same source of pressure fluid as the steering motor to be described, and in the present instance has been shown as a vacuum motor adapted to be connected to the vehicle engine intake manifold (not shown). The motor 31 comprises upper and lower preferably stamped casing sections 32 and 33 between which is clamped a diaphragm 34 urged upwardly by a spring 35. The upper casing section 32 is vented to the atmosphere as at 36 while a vacuum pipe 37 leads to the lower casing section 33. When pressure is balanced above and below the diaphragm 34 the spring 35 maintains the diaphragm 34 in its uppermost position and when vacuum is present in the lower casing section 33, the diaphragm 34 moves downwardly against the tension of the spring 35.

The plate 25 is provided with an offset upward extension 38 at its upper end and this extension is connected to the lower end of a rod 39, the upper end of this rod extending through a bearing 40 in the bottom of the motor 31 and being connected at its upper extremity to the diaphragm 34. The motor 31 is preferably secured to an upwardly extending arm 41 which may be formed integral with the lever arm 17. Accordingly it will be apparent that the motor 31 and lever arm 17 always move as a unit, and accordingly the rod 39 will remain stationary in any stationary position of the plate 25.

The vacuum line 37 is preferably in the form of a rubber or other flexible hose to permit movement of the motor 31 when the steering arm 17 swings with the shaft 15. A valve body 42 (Figures 1 and 6) is connected in the line 37, this line leading to one branch 43 of a T 44, another branch 45 of this T being suitably connected to the intake manifold of the vehicle engine (not shown). The valve body 42 is provided with a passage 46 therethrough controlled by a valve 47 vertically slidable in the valve body and provided with a groove 48 opening communication through the line 37 when the valve is in its upper position. A solenoid 49 is energizable in a manner to be described to move the valve 47 to its open position and a spring 50 normally urges the valve downwardly to closed position. When the valve 47 is in its lower position, the vacuum line 37 leading to the motor 31 is bled to the atmosphere through a groove 51 in the valve and through a bleed port 52 in the valve body 42.

A motor indicated as a whole by the numeral 53 and illustrated in detail in Figure 4 serves as the source of power for providing power steering when desired. The motor comprises a cylinder 54 having an integral head 55 at one end and a removable preferably die cast head 56 at its other end, the head 56 having a central frustro-conical portion 57 to receive a portion of the piston of the motor, to be described. The head 56 is further provided with an axial bearing 58. The head 55 is provided with an extended lug 59 having an opening 60 to receive a suitable pivot pin, carried by any desired stationary portion of the vehicle for pivotally supporting the motor 53.

A preferably die cast piston 61 is reciprocable in the cylinder 54 and is provided in its right hand end as viewed in Figure 4 with a recess 62 forming a pressure chamber to be referred to later. A cap 63 is arranged over such face of the piston and is similarly recessed to provide a pressure chamber 64, also to be referred to later. A flexible diaphragm 65 is clamped between the piston body 61 and cap 63 to be influenced by pressures in the chambers 62 and 64 in a manner and for a purpose to be described. The left end of the piston 61 as viewed in Figure 4 is provided with an axial extension 66 receiving a tubular piston rod 67 extending through and slidable in the bearing 58. The free end of this rod is provided with a head 68 having an offset end 69 (Figures 4 and 5) carrying a relatively heavy preferably integral pin 70 engaging in a slot 71 formed in the lever arm 17 and elongated parallel to the axis of the piston rod 67 and transverse to the length of the lever 17. When the plate 25 is in its upper position the pin 70 is free to move independently of the lever 17 within the limits of the slot 71, and when the plate 25 is in its lower position as shown in Figure 3, the pin 70 directly engages the wedge faces of the notch 30 to transmit movement to the lever 17.

A valve indicated as a whole by the numeral 72 is slidable in the inner end of the tubular piston rod 57. The end of the valve adjacent the diaphragm 65 is solid and is connected thereto by a screw 73 as shown in Figure 4. The valve is provided with an annular elongated groove 74 adapted to communicate with either of a pair of ports 75 or 76 formed in the tubular piston rod 67. As will be referred to later, atmospheric pressure is always present in the groove 74. The valve is provided with an axial recess 77, which is always connected to the source of partial vacuum, as will be described, and this recess communicates through a port 78 with an annular groove 79. This groove is normally in restricted communication with the port 76, and it will be noted that the left hand end of the valve in Figure 4 normally affords restricted communication between the port 75 and the vacuum space at the adjacent end of the valve, this space being in constant communication with the recess 77 and being connected to the source of partial vacuum in a manner to be described. With the parts in the position shown, therefore, the piston 61 is normally vacuum suspended in the cylinder 54. Slight movement of the valve in either direction will cut off one of the ports 75 or 76 from the source of vacuum and connect it to the atmosphere through the groove 74, whereupon the piston 61 will move in one direction or the other.

The port 75 communicates with the right hand end of the cylinder 54 as viewed in Figure 4 through a passage 80 in the piston 61, this passage extending through the diaphragm 65 and cap 63, as shown in Figure 4. The face of the piston 61 adjacent the diaphragm is grooved as at 81 to maintain in the chamber 62 a pressure identical with the pressure in the right hand end of the cylinder 54. The port 76 communicates with the left hand end of the cylinder 54 through a passage 82 which leads into a passage 83, one end of which communicates with the left hand end of the cylinder 54 and the other end of which communicates with the chamber 64 through a groove 84 formed in the adjacent face of the cap 63.

A tube 85 is arranged within the piston rod 67. This tube is provided at one end with an annular flange 86 and has its other end fitted into a ring 87 in the rod 67. Thus the tube 85 and piston rod 67 cooperate to form an air space 88 closed at its ends by the flange 86 and ring 87. This space communicates with the annular air space 74 of the valve through a passage 89 formed in the projecting portion 66 of the piston 61 (Figure 4).

A rubber or similar longitudinally extensible and collapsible boot 90 has one end fitted to the bearing 58 and its other end fitted to the head 68 and forms an air space therein communicating with the space 88 through a port 91. The bearing 58 is provided with an air passage 92 communicating at one end with the interior of the boot and at its other end with a recess 93 formed in the bearing 58. An air pipe 94 is tapped into the bearing 58 to communicate with the recess 93 and is preferably provided with a small air cleaner 95 to prevent the entrance of dust or other foreign material into the mechanism.

A valve operating rod 96 is arranged within the tube 85 and is of smaller diameter than the interior of the tube 85 to form a vacuum space 97 communicating with the space between the tube 85 and the adjacent end of the valve 72, it consequently also communicating with the axial recess 77 in the valve. The left hand end of the rod 96 as viewed in Figure 4 is slidable in a bearing opening 98 formed in the head 68 and a yoke 99 is formed on the free end of the rod 96 to receive a pin 100 mounted in the lower end of the lever 16. The vacuum space 97 communicates at its forward end with a vacuum space 101 around the rod 96 and within the head 68 and a nipple 102 communicates with the space 101. A rubber or other flexible hose 103 (Figure 1) connects the nipple 102 to the third branch 104 of the T 44.

One form of electrical control system for the apparatus is shown in Figure 6, this system determining solely in accordance with vehicle speed whether the steering mechanism will operate manually or by power. Referring to the diagrammatic representation in Figure 6, the numeral 105 designates the propeller shaft of the vehicle which, of course, is connected to the driving wheels of the vehicle through the usual differential (not shown) and accordingly the rotational speed of the shaft 105 is always proportional to the rotational speed of the rear wheels of the vehicle and consequently to the speed of movement of the vehicle. The shaft 105 is shown as being provided with a bevel gear 106 driving a bevel pinion 107 mounted on a shaft 108. This shaft carries a bevel pinion 109 and the shaft 108 is preferably the driving shaft of the speedometer, the latter being driven through the usual flexible shaft 110 mounted in a casing 111.

The bevel pinion 109 drives a similar pinion 112 mounted on a shaft 113 which drives any desired type of governor 114. The governor carries a resilient switch arm 115 engageable with a contact 116 when the vehicle speed is below a predetermined point, for example ten miles an hour. Above such speed the circuit between the switch arm 115 and contact 116 is broken. The governor shaft is shown as being grounded at 117 and the contact 116 is connected to a wire 118 leading to one terminal of the solenoid 49. The other terminal of the solenoid is connected by a wire 119 to a source of current 120, such as the vehicle battery, and the other terminal of the battery is grounded as at 121.

In order to enable the operator to manually control the system to provide for power steering under conditions in which it otherwise would not occur, a manually operable switch 122 is provided. This switch is connected to one end of a wire 123 the other end of which is connected to the wire 118. The switch 122 is engageable with a contact 124 grounded as at 125.

The system illustrated in Figure 7 provides for power steering in low and reverse gears with manual steering taking place under all other conditions, and accordingly it will be apparent that this system provides for power steering when the vehicle is stationary or moving slowly with the gear set in low or reverse gears. In this system the numeral 126 designates a conventional transmission having a low and reverse gear shift rail 127 and a second and high gear shift rail 128. The shift rail 127 is grounded through the transmission as at 129 and is provided with a fork 130 engageable with a switch arm 131 to move the latter into engagement with either of a pair of contacts 132 or 133, depending upon whether the shift is made into low or reverse gear.

One terminal of the solenoid 49 is connected by a wire 134 to the contact 132, and a wire 135 is connected between the wire 134 and the contact 133. The other terminal of the solenoid 49 is connected by a wire 136 to one terminal of a source 137, the other terminal of which is grounded as at 138. A wire 139 connects the wire 134 to a manually operable switch 140 engageable with a contact 141 grounded as at 142. The switch 140 provides for manual selection of power steering at the option of the operator when the mechanism otherwise would be conditioned for manual steering.

The operation of the mechanism is as follows:

Assuming that the vehicle is at a standstill or moving at a speed below a predetermined speed, for example ten miles per hour, and assuming that the apparatus is being controlled by the electrical system in Figure 6, the switch arm 115 will be in engagement with the contact 116 to complete a circuit from the source 120 through wire 119, through the solenoid 49, wire 118, contact 116 and switch arm 115, and thence back to the source through grounds 117 and 121. Accordingly the solenoid 49 will be energized and the valve 47 will be moved to the position shown in Figure 6 opening communication between the bottom of the motor 31 and the intake manifold through the T 44. In this connection it will be noted that the vacuum line 103 is always open to the intake manifold and accordingly the valve mechanism of the motor 53 is always connected to the intake manifold, it being necessary only to control the line 37 to provide the desired results, as will become apparent.

With the partial vacuum established beneath the diaphragm 34, atmospheric pressure above the diaphragm will move it downwardly and thus move the plate 25 to the position shown in Figure 3, the inclined faces 30 coming substantially into contact with the pin 70 and preventing movement of this pin with respect to the plate 25 and consequently with respect to the lever 17. Movement of the piston of the motor thus will transmit movement through the plate 25 to the lever 17 when the motor is energized. Assuming that the operator now turns the steering wheel 12, this action will rotate the shaft 15 (Figures 3 and 5) to turn the lever arm 16, which is keyed to the shaft 15. The lever arm 17 is free on the shaft 15 and the substantial clearance between the stop pads 23 (Figure 3) and the lever 17 permits appreciable movement of the lever 16 without transmitting movement to the lever arm 17. This appreciable independent movement is utilized for operating the valve mechanism.

The lower end of the lever arm 16 is connected by the yoke 99 to the valve rod 96. Assuming that turning movement of the lever arm 16 moves the valve 72 to the left as viewed in Figure 4, the left hand end of the valve will close communication between the port 75 and the vacuum space adjacent the end of the valve and will open communication between the atmospheric space 74 and the port 75. At the same time, the vacuum groove 79 will be opened to a greater degree of communication with the port 76. The latter port communicates with the left hand end of the cylinder 54 and exhausts air therefrom while air at atmospheric pressure will be admitted into the right hand end of the cylinder 54 through port 75 and passage 80. Accordingly the piston 61 will start to move toward the left as viewed in Figure 4, which is the same direction of movement which is being imparted to the valve 72. Whenever movement of the valve is arrested by stopping the turning movement of the steering wheel, the piston 61 will move the additional slight distance necessary to restore the normal position of the parts as shown in Figure 4, the port 75 being "cracked" to the vacuum space adjacent the end of the valve, thus exhausting air from the right hand end of the cylinder until it balances the pressure in the left hand end of the cylinder. This result takes place very promptly when movement of the valve is stopped, and movement of the piston will be arrested at the desired point.

As previously stated movement of the piston 61 is transmitted through the tubular piston rod 67 to the head 68 and thence through the pin 70 (Figures 3 and 5) to the plate 25 to swing the lower end of the lever arm 17 and thus move the drag link 22. Thus the motor accomplishes through power the movement of the drag link usually effected by the manual force exerted by the operator. The diaphragm 65 (Figure 4) within the motor piston provides the operator with "feel," this mechanism resisting turning movement of the steering wheel 12 to a degree proportional to the resistance encountered by the motor 53 in moving the drag link 22. The pressure in the right hand end of the cylinder 54 (Figure 4) is duplicated in the chamber 62 through the groove 81 while the reduced pressure in the left hand end of the cylinder 54, under the conditions described, is duplicated in the chamber 64. With the piston 61 moving toward the left, therefore, the same pressures per square inch which affect the piston 61 will reversely affect the diaphragm 65, tending to move it to the right while the operator is moving the valve 72 toward the left. The diaphragm being of much smaller area than the piston, the differential pressure on the diaphragm which the operator must overcome is very materially less than but none the less proportional to the differential pressures affecting the piston 61.

The total differential pressure affecting the piston 61 will depend upon resistance encountered by the piston in operating the drag link 22. It will be apparent that the greater the effort which must be exerted by the piston 61, the greater will be the tendency of the piston 61 to move relatively slowly. Accordingly there is less tendency for the piston to satisfy the partial vacuum at one side thereof, thus resulting in a drop in pressure in the vacuum end of the cylinder. The less the resistance encountered by the piston 61, the greater will be its tendency to move rapidly to tend to satisfy the partial vacuum, thus tending to limit the reduction in pressure in the vacuum end of the cylinder. Thus it will be apparent that differential pressures on opposite sides of the piston 61 will depend upon resistances encountered by the piston in performing its intended function, and since the pressures per square inch affecting the diaphragm 65 are identical with the pressures per square inch affecting the piston 61, the operator will feel through the steering wheel a resistance proportional to the resistance encountered by the motor in turning the front wheels of the vehicle.

When the valve 72 is moved toward the right as viewed in Figure 4 the identical operation will occur except for a reversal of pressures in the ends of the cylinder 54 and in the chambers 62 and 64. The groove 79 will move out of communication with the port 76 to cut off the latter from the source of vacuum and the atmospheric groove 74 will come into communication with the port 76 to admit air into the left hand end of the cylinder through passage 82. At the same time, the port 75 will be opened to a greater extent to the vacuum space adjacent the end of the valve to exhaust air from the right hand end of the cylinder 54. Accordingly the piston 61 will move to the right while atmospheric pressure in the chamber 64 will oppose movement of the diaphragm 65 and accordingly movement of the valve 72 to an extent proportional to differential pressures in the ends of the motor. Whenever movement of the valve 72 is stopped, a slight additional movement of the piston will again restore the relative normal position of the valve 72 and ports 75 and 76 to arrest motion of the piston 61.

Accordingly it will be apparent that a follow-up action is provided in either direction of movement of the valve 72 and the ports 75 and 76, the piston always moving a distance corresponding to the turning movement of the steering wheel and then automatically stopping. The fluid pressure opposing movement of the diaphragm 65 prevents free and loose movement of the valve 72 which, in previous fluid pressure power mechanisms for the steering mechanisms of motor vehicles, has caused lack of stability in the valve mechanisms and the creeping of the piston of the motor. The present device provides great stability in operation and tendency of the piston 61 to creep is immediately overcome by the closing of one or the other of the ports 75 or 76 to the source of vacuum to prevent the further exhaustion of air from the end of the cylinder toward which the piston 61 is creeping. Any slight additional tendency to creep, due to the placing of additional turning strains on the front wheels, for example, when passing over rough or grooved surfaces, will immediately open communication between the atmospheric groove 74 and the end of the cylinder toward which the piston is creeping to build up whatever differential pressure is necessary to arrest movement of the piston.

The power operation of the steering mechanism eliminates the necessity for providing a high gear ratio in the steering housing 13 and eliminates the necessity for the operator's having to exert substantial manual force in turning the front wheels of the vehicle when moving into or out of limited parking spaces. The reduction in the steering ratio permits sufficiently easy turning of the steering wheel when the vehicle is moving at a substantial speed without the necessity of having to turn the steering wheel to the extent necessary with present steering mechanisms.

After the vehicle has gotten underway and its speed reaches the predetermined point referred to, the governor 114 will break the circuit across the switch arm 115 and contact 116, whereupon the solenoid 49 will be deenergized and the valve 47 will drop to closed position with the groove 51 (Figure 6) venting the vacuum line 37 to the control motor 31. The spring 35 will thereupon move the diaphragm 34 upwardly to move the plate 25 to its upper position with the wedge faces 29 engaging the corresponding faces 24 of the stop pads 23. Under such conditions the lever arms 16 and 17 will be locked together for movement as a unit. Turning movement of the steering wheel will then operate the lever arm 16 in the manner previously described and the turning movement of this arm will be transmitted directly to the lever arm 17 to manually actuate the drag link 22. With the system shown in Figure 6, therefore, manual steering will take place at all vehicle speeds above the speed at which the switch arm 115 initially leaves the contact 116.

With the plate 25 (Figure 3) moved to its upward position the pin 70 is free for relative movement in the slot 71 of the lever arm 17. As manual operation of the lever arm 16 takes place this movement is transmitted to the lever arm 17, as previously stated, and at the same time the lever arm 16 will operate the valve rod 96 (Figure 4) in the same manner as for power actuation. Since there is a slight lagging in the operation of the piston 61 with respect to the valve 72, it will be apparent that it is necessary to move the valve 72 a slight distance before the piston 61 starts to operate.

The provision of the slot 71 permits movement of the piston 61 to lag behind movement of the lever arm 17. However, after this arm has moved a short distance with the lever arm 16, the valve 72 will move with respect to the piston 61 to build up differential pressure in one end or the other of the cylinder 54 to cause the piston to follow-up with respect to the valve mechanism. This follow-up operation starts to take place and continues throughout manual operation of the steering mechanism without movement of the pin 70 (Figure 3) a sufficient distance to reach either end of the slot 71. Accordingly in the manual operation of the mechanism the constant communication provided between the valve mechanism 72 and the source of partial vacuum permits the operation of the valve 72 in the same manner as for power steering and the piston 61 and the elements connected thereto will follow-up with respect to the lower end of the lever 17 without acting as a drag thereon. Thus the mechanism will operate in exactly the same manner as conventional manual steering mechanisms without the operator having to exert the substantial additional force necessary to move the piston 61 in the cylinder 54.

The operation of the system shown in Figure 7 does not affect the operation of any of the mechanical parts of the apparatus but merely is an alternative system for determining when the apparatus will provide power steering and when it will provide manual steering. Instead of energizing and deenergizing the solenoid 49 in accordance with vehicle speeds, this solenoid is energized and deenergized in accordance with the gear ratio being employed in the transmission. When the shift rail 127 is shifted into low or reverse gear, which normally is done when the vehicle is stationary, the circuit for the solenoid 49 will be completed across the switch arm 131 and either of the contacts 132 or 133. Accordingly when the vehicle is stationary or is moving slowly in low or reverse gears, power steering will be provided, and under all other gear conditions steering will take place manually.

The present apparatus, in accordance with the foregoing description, overcomes the principal existing difficulty with present day steering mechanisms, namely, the very substantial force necessary in moving a vehicle into and out of a limited parking space. However, the length of life of the mechanism is very materially increased by the fact that it operates under a load only a small proportion of the time when the vehicle is stationary or moving at low speeds. Moreover, the system permits the use of a relatively powerful motor as is desirable under the conditions in which the present apparatus is intended to operate as a power steering mechanism. A motor sufficiently powerful for operation under such conditions is too powerful for operation when the vehicle is under substantial headway, and the present mechanism provides means for automatically transforming the apparatus from a power steering mechanism to a manual steering mechanism when the vehicle is under substantial headway.

Where the expression "vehicle-propelling driving means" is employed in the claims, it is understood that this term is used generically to indicate any portion of a motor vehicle which may be used to control the operation of the auxiliary motor. For example, any suitable portion of the vehicle clutch or transmission, or any driven element between the transmission and the driven wheels of the vehicle, or the rotary action of the vehicle wheels, etc., may be utilized for this purpose.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. In a steering mechanism for a motor vehicle having a steering wheel and motion transmitting means for transmitting steering movements to the dirigible wheels of the vehicle, a power device having mechanical connection with said motion transmitting means, a control mechanism for said power device operable by the steering wheel and by the power device and constructed and arranged to cause a follow-up operation of the power device with respect to the steering wheel upon any turning movement of the latter, and means constructed and arranged for selective operation for directly transmitting manual movement of the steering wheel to said motion transmitting means, or for rendering the steering wheel ineffective for manually actuating said motion transmitting means while rendering the latter operable by said power device.

2. In a steering mechanism for a motor vehicle having a steering wheel and motion transmitting means for transmitting turning movements to the dirigible wheels of the vehicle, a power device, a follow-up control mechanism for said power device for causing it to partake of a follow-up action with respect to the steering wheel upon movement thereof, and means constructed and arranged to be selectively operative under different conditions for mechanically connecting the steering wheel to said motion transmitting means to effect manual steering of the vehicle, or to connect said power device to said motion transmitting means to effect power steering of the vehicle.

3. In a steering mechanism for a motor vehicle having a steering wheel and motion transmitting means for transmitting turning movements to the dirigible wheels of the vehicle, a power device, a follow-up control mechanism for said power device for causing it to partake of a follow-up action with respect to the steering wheel upon movement thereof, motion transmitting connections between the steering wheel and said power device and said motion transmitting means, said motion transmitting connections including a control device for providing lost motion between the steering wheel and the motion transmitting means or between said power device and the motion transmitting means, and means constructed and arranged to be automatically operative under different predetermined conditions for rendering said control device operative for preventing lost motion between said motion transmitting means and either the steering wheel or said power device to provide for either manual or power steering.

4. In a steering mechanism for a motor vehicle having a steering wheel and motion transmitting means for transmitting steering movements to the dirigible wheels of the vehicle, a fluid pressure motor having control valve means operable by the steering wheel, and means constructed and arranged for operation under different conditions for utilizing differential pressures in said motor for actuating said motion transmitting means independently of the steering wheel or for connecting said motion transmitting means to the steering wheel for direct manual operation thereby.

5. In a steering mechanism for a motor vehicle having a steering wheel and motion transmitting means for transmitting steering movements to the dirigible wheels of the vehicle, a fluid pressure motor having mechanical connection with said motion transmitting means, a control valve mechanism for said motor operable by the steering wheel, and means constructed and arranged for operation under different conditions for directly transmitting manual movement of the steering wheel to said motion transmitting means while rendering said motor ineffective for moving the latter, or for rendering the steering wheel ineffective for manually actuating said motion transmitting means while rendering the latter operable by said motor.

6. In a steering mechanism for a motor vehicle having a steering wheel and motion transmitting means for transmitting turning movements to the dirigible wheels of the vehicle, a fluid pressure motor, a follow-up control valve mechanism for said motor for causing it to partake of a follow-up action with respect to the steering wheel upon movement thereof, and means constructed and arranged to be operative under different conditions for mechanically connecting the steering wheel to said motion transmitting means to effect manual steering of the vehicle, or to connect said motor to said motion transmitting means to effect power steering of the vehicle.

7. In a steering mechanism for a motor vehicle having a steering wheel and motion transmitting means for transmitting turning movements to the dirigible wheels of the vehicle, a fluid pressure motor, a follow-up control valve mechanism for said motor for causing it to partake of a follow-up action with respect to the steering wheel upon movement thereof, motion transmitting connections between the steering wheel and said motor and said motion transmitting means, a device for providing lost motion between the steering wheel and the motion transmitting means or between said motor and the motion transmitting means, and means constructed and arranged to be automatically operative under predetermined conditions for rendering said device operative for preventing lost motion between said motion transmitting means and either the steering wheel or said motor to provide for either manual or power steering.

8. In a steering mechanism for a motor vehicle having a steering wheel and motion transmitting means for transmitting steering movements to the dirigible wheels of the vehicle, a power device, a lever mechanism connected to said power device and to the steering wheel and to the motion transmitting means, and means constructed and arranged for rendering said lever mechanism selectively effective for actuating said motion transmitting means by said power device or by the steering wheel, each independently of the other.

9. In a steering mechanism for a motor vehicle having a steering wheel and motion transmitting means for transmitting steering movements to the dirigible wheels of the vehicle, a power device, a lever mechanism connected to said power device and to the steering wheel and to the motion transmitting means, a follow-up control mechanism for said power device constructed and arranged for operation by the steering wheel through a portion of said lever mechanism and by said power device to cause the latter to partake of a follow-up action with respect to movement of the steering wheel, and means constructed and arranged for rendering said lever mechanism selectively effective for actuating said motion transmitting means by said power device or by the steering wheel, each independently of the other.

10. In a steering mechanism for a motor vehicle having a steering wheel and motion transmitting means for transmitting steering movements to the dirigible wheels of the vehicle, a power device, a lever mechanism connected to said power device and to the steering wheel and to the motion transmitting means, a follow-up control mechanism for said power device constructed and arranged for operation by the steering wheel through a portion of said lever mechanism and by said power device to cause the latter to partake of a follow-up action with respect to movement of the steering wheel, a portion of said lever mechanism being connected to the motion transmitting means, said lever mechaninsm having lost motion connection with said power device and with the steering wheel, and means constructed and arranged for rendering said lost motion connections selectively inoperative to provide either manual or power operation of said portion of said lever mechanism to actuate said motion transmitting means.

11. In a steering mechanism for a motor vehicle having a steering wheel and motion transmitting means for transmitting steering movements to the dirigible wheels of the vehicle, a pair of levers one positively operable by the steering wheel and the other positively connected to said motion transmitting means, a power device having lost motion connection with the second named lever, a control mechanism for the power device operable upon turning movement of the steering wheel, said levers having lost motion connection with each other, and a device selectively operable for positively connecting said levers to each other for the manual actuation of said motion transmitting means or for positively connecting said power device to said second named lever for the power actuation of said motion transmitting means.

12. In a steering mechanism for a motor vehicle having a steering wheel and motion transmitting means for transmitting turning movements to the dirigible wheels of the vehicle, a pair of levers one positively operable by the steering wheel and the other positively connected to said motion transmitting means, one of said levers having stop means for limiting relative movement of said levers with respect to each other, a power device having a lost motion connection with the second named lever, a control mechanism for the power device operable upon turning movement of the steering wheel, and a device constructed and arranged to selectively cooperate with said stop means or with said lost motion connection to respectively lock said levers against relative movement for the manual actuation of said motion transmitting means or for positively connecting said power device to the second named lever for the power actuation of said motion transmitting means.

13. In a steering mechanism for a motor vehicle having a steering wheel and motion transmitting means for transmitting steering movements to the dirigible wheels of the vehicle, a shaft mechanically connected to the steering wheel to be operated thereby, a pair of levers mounted on said shaft, one fixed to said shaft and the other free thereon and positively connected to said motion transmitting means, a power device connected to said second named lever, means for utilizing turning movement of said shaft for actuating said power device, and means for positively connecting said levers together for the manual actuation of the second named lever and of said motion transmitting means.

14. In a steering mechanism for a motor vehicle having a steering wheel and motion transmitting means for transmitting steering movements to the dirigible wheels of the vehicle, a shaft mechanically connected to the steering wheel to be operated thereby, a pair of levers mounted on said shaft, one fixed to said shaft and the other free thereon and positively connected to said motion transmitting means, a power device connected to said second named lever, a control mechanism for said power device operable upon turning movement of said shaft whereby manual movement of the latter causes actuation of said power device to actuate the second named lever and said motion transmitting means, and means for positively connecting said levers together for the manual actuation of said motion transmitting means.

15. In a steering mechanism for a motor vehicle having a steering wheel and motion transmitting means for transmitting steering movements to the dirigible wheels of the vehicle, a shaft mechanically connected to the steering wheel to be operated thereby, a pair of levers mounted on said shaft, one fixed to said shaft and the other free thereon and positively connected to said motion transmitting means, a power device connected to said second named lever, a follow-up control mechanism for said power device comprising a pair of elements one movable in accordance with operation of the power device and the other operable by said shaft whereby said second named lever partakes of movement corresponding to manual movement of the first named lever, and means for positively connecting said levers together for the manual actuation of said motion transmitting means.

16. In a steering mechanism for a motor vehicle having a steering wheel and motion transmitting means for transmitting steering movements to the dirigible wheels of the vehicle, a shaft mechanically connected to the steering wheel to be operated thereby, a pair of levers mounted on said shaft, one fixed to said shaft and the other free thereon and positively connected to said motion transmitting means, a power device connected to said second named lever, a follow-up control mechanism for said power device comprising a pair of elements one movable in accordance with operation of the power device and the other operable by said shaft whereby said second named lever partakes of movement corresponding to manual movement of the first named lever, and means for positively connecting said levers together for the manual actuation of said motion transmitting means, said last named means being constructed and arranged, upon operation thereof, to render said power device ineffective for transmitting movement to the second named lever.

17. In a steering mechanism for a motor vehicle having a steering wheel and motion transmitting means for transmitting steering movements to the dirigible wheels of the vehicle, a shaft rotatable by the steering wheel, a pair of lever arms mounted on said shaft, one fixed to said shaft to turn therewith and the other free on said shaft and positively connected at a point remote therefrom to said motion transmitting means, said lever arms being constructed and arranged for limited relative turning movement, a power device having lost motion connection with the second named lever arm, a follow-up control mechanism for said power device having a pair of elements one operable by the first named lever arm and the other in accordance with movement of the second named lever arm, and a device carried by one of said lever arms and constructed and arranged for selective operation for positively connecting said lever arms together for the manual actuation of said motion transmitting means, or for positively connecting said power device to said second named lever arm.

18. In a steering mechanism for a motor vehicle having a steering wheel and motion transmitting means for transmitting steering movements to the dirigible wheels of the vehicle, a shaft rotatable by the steering wheel, a pair of lever arms mounted on said shaft, one fixed to said shaft to turn therewith and the other free on said shaft and positively connected at a point remote therefrom to said motion transmitting means, said lever arms being constructed and arranged for limited relative turning movement, and a differential pressure motor having a movable element provided with lost motion connection with said second named lever arm, a follow-up control valve mechanism having a pair of elements one operable by said first named lever arm and the other by said movable element, and a device selectively operable for positively connecting said lever arms to each other for the manual operation of said motion transmitting means, or for positively connecting said movable element to the second named lever for the power actuation of said motion transmitting means.

19. In a steering mechanism for a motor vehicle having a steering wheel and motion transmitting means for transmitting steering movements to the dirigible wheels of the vehicle, a shaft rotatable by the steering wheel, a pair of lever arms mounted on said shaft in parallel planes, one of said lever arms being fixed to said shaft and the other being free on said shaft and positively connected at a point remote therefrom to said motion transmitting means, a pair of lugs carried by one lever arm and projecting across opposite edges of the other lever arm in spaced relation thereto to provide for limited relative movement between said lever arms, a power device having lost motion connection with the second named lever arm, means for causing actuation of said power device upon turning movement of the steering wheel, and a member mounted on one of said lever arms and selectively operable to engage said lugs to prevent relative movement between said lever arms, or to effect a positive connection between said power device and the second named lever arm.

20. In a steering mechanism for a motor vehicle having a steering wheel and motion transmitting means for transmitting steering movements to the dirigible wheels of the vehicle, a shaft rotatable by the steering wheel, a pair of lever arms mounted on said shaft in parallel planes, one of said lever arms being fixed to said shaft and the other being free on said shaft and positively connected at a point remote therefrom to said motion transmitting means, a pair of lugs carried by one lever arm and projecting across opposite edges of the other lever arm in spaced relation thereto to provide for limited relative movement between said lever arms, a power device having lost motion connection with the second named lever arm, means for causing actuation of said power device upon turning movement of the steering wheel, a member mounted on one of said lever arms and selectively operable to engage said lugs to prevent relative movement between said lever arms, or to effect a positive connection between said power device and the second named lever arm, and an auxiliary power device for selectively operating said member.

21. In a steering mechanism for a motor vehicle having a steering wheel and motion transmitting means for transmitting steering movements to the dirigible wheels of the vehicle, a motor, a device constructed and arranged for selective operation for rendering said motor operative for moving said motion transmitting means independently of the steering wheel or for connecting the motion transmitting means to the steering wheel for direct manual operation thereby, and an auxiliary motor for selectively operating said device.

22. In a steering mechanism for a motor vehicle having a steering wheel and motion transmitting means for transmitting turning movements to the dirigible wheels of the vehicle, a motor, a follow-up control mechanism for causing said motor to partake of a follow-up action with respect to the steering wheel, a device constructed and arranged to be selectively operated for mechanically connecting the steering wheel to said motion transmitting means to effect manual steering of the vehicle, or for connecting said motor to said motion transmitting means to effect power steering of the vehicle, and an auxiliary motor for selectively operating said device.

23. In a steering mechanism for a motor vehicle having a steering wheel and motion transmitting means for transmitting steering movements to the dirigible wheels of the vehicle, a fluid pressure motor, a follow-up control valve mechanism for causing said motor to partake of a follow-up action with respect to the steering wheel, a device constructed and arranged to be selectively operated for utilizing differential pressures in said motor for actuating said motion transmitting means or for establishing mechanical connection between the latter and the steering wheel for manual operation thereby, and an auxiliary fluid pressure motor connected to said device to selectively operate it.

24. In a steering mechanism for a motor vehicle having a steering wheel and motion transmitting means for transmitting steering movements to the dirigible wheels of the vehicle, a fluid pressure motor, a follow-up control valve mechanism for causing said motor to partake of a follow-up action with respect to the steering wheel, a device selectively movable between two positions and constructed and arranged to be operative in the respective positions for utilizing differential pressures in said motor for actuating said motion transmitting means and for establishing mechanical connection between the latter and the steering wheel for direct manual operation thereby, and an auxiliary motor having a movable element connected to said device, said auxiliary motor having means biasing said device to one of said two positions, and being provided with a pressure chamber for connection to a source of pressure differential for moving said device to its other position.

25. In a steering mechanism for a motor vehicle having a steering wheel and motion transmitting means for transmitting steering movements to the dirigible wheels of the vehicle, a shaft rotatable by the steering wheel, a pair of lever arms mounted on said shaft, one fixed to said shaft and the other free thereon and positively connected at a point remote therefrom to said motion transmitting means, a pair of lugs carried by one lever arm and projecting across the edges of the other lever arm to provide for limited relative movement between said lever arms, a fluid pressure motor having a movable structure including a rod, a pin carried by said rod, the second named lever arm being provided with a slot receiving said pin to provide lost motion connection between said pin and the second named lever arm, a control valve mechanism for said motor operable upon turning movement of the steering wheel, and a locking device movable between two positions, said device being constructed and arranged to engage said lugs when in one position to fix said lever arms against relative movement, and to engage said pin when in the other position to positively connect said pin to said second named lever.

26. In a steering mechanism for a motor vehicle having a steering wheel and motion transmitting means for transmitting steering movements to the dirigible wheels of the vehicle, a shaft rotatable by the steering wheel, a pair of lever arms mounted on said shaft, one fixed to said shaft and the other free thereon and positively connected at a point remote therefrom to said motion transmitting means, a pair of lugs carried by one lever arm and projecting across the edges of the other lever arm to provide for limited relative movement between said lever arms, a fluid pressure motor having a movable structure including a rod, a pin carried by said rod, the second named lever arm being provided with a slot receiving said pin to provide lost motion connection between said pin and the second named lever arm, a control valve mechanism for said motor operable upon turning movement of the steering wheel, a locking device movable between two positions, said device being constructed and arranged to engage said lugs when in one position to fix said lever arms against relative movement, and to engage said pin when in the other position to positively connect said pin to said second named lever arm, and an auxiliary motor for moving said locking device between said two positions.

27. In a steering mechanism for a motor vehicle having a steering wheel, motion transmitting means for transmitting steering movements to the dirigible wheels of the vehicle, and vehicle-propelling driving means, a power device, follow-up control means for said power device operable under any conditions by the steering wheel, and control means constructed and arranged for operation under predetermined conditions of the driving means for positively connecting said power device to said motion transmitting means and under other conditions of the driving means for providing positive connection between said steering wheel and said motion transmitting means whereby the latter will be manually operable by the steering wheel.

28. In a steering mechanism for a motor vehicle having a steering wheel, motion transmitting means for transmitting steering movements to the dirigible wheels of the vehicle, and vehicle-propelling driving means, a fluid pressure motor having a follow-up control valve mechanism operable under any conditions by the steering wheel, and control means constructed and arranged for operation under predetermined conditions of the driving means for positively connecting said motor to said motion transmitting means and under other conditions of the driving means for establishing positive connection between the steering wheel and said motion transmitting means whereby the latter will be manually operable by the steering wheel.

29. In a steering mechanism for a motor vehicle having a steering wheel, motion transmitting means for transmitting steering movements to the dirigible wheels of the vehicle, and vehicle-propelling driving means, a power device, follow-up control means for said power device operable under any conditions by the steering wheel, control means constructed and arranged for selective operation for mechanically connecting said power device to said motion transmitting means or for establishing positive connection between the steering wheel and said motion transmitting means whereby the latter will be manually operable by the steering wheel, and means constructed and arranged for selectively operating said control means in accordance with different predetermined conditions in the driving means.

30. In a steering mechanism for a motor vehicle having a steering wheel, motion transmitting means for transmitting steering movements to the dirigible wheels of the vehicle, and vehicle-propelling driving means, a fluid pressure motor, a control valve mechansm for said motor constructed and arranged to provide a follow-up action of said motor with respect to turning movement of the steering wheel under any conditions, control means selectively operable for establishing connection between said motor and said motion transmitting means or for establishing connection between the steering wheel and said motion transmitting means whereby the latter will be manually operable by the steering wheel, and means constructed and arranged for rendering said control means selectively operable in accordance with two different conditions of said driving means.

31. In a steering mechanism for a motor vehicle having a steering wheel, motion transmitting means for transmitting steering movements to the dirigible wheels of the vehicle, and vehicle-propelling driving means, a pair of levers one positively operable by the steering wheel and the other positively connected to said motion transmitting means, a power device having lost motion connection with the second named lever, a control mechanism for the power device operable upon turning movement of the steering wheel, said levers having lost motion connection with each other, a device selectively operable for positively connecting said levers to each other for the manual actuation of said motion transmitting means or for positively connecting said power device to said second named lever for the power actuation of said motion transmitting means, and control means constructed and arranged for operation under predetermined conditions of the driving means for selectively operating said device.

32. In a steering mechanism for a motor vehicle having a steering wheel, motion transmitting means for transmitting steering movements to the dirigible wheels of the vehicle, and vehicle-propelling driving means, a pair of levers one positively operable by the steering wheel and the other positively connected to said motion transmitting means, said levers having interengaging stop portions for limiting relative movement therebetween, a fluid pressure motor having a movable element provided with lost motion connection with the second named lever, a follow-up control valve mechanism for the motor operable by the steering wheel and by the movable element of said motor, a device constructed and arranged for selective operation to fix said levers together or to positively connect the movable element of said motor with said second named lever, and control means constructed and arranged for operation in accordance with two different conditions of the driving means for selectively operating said device.

33. In a steering mechanism for a motor vehicle having a steering wheel, motion transmitting means for transmitting steering movements to the dirigible wheels of the vehicle, and vehicle-propelling driving means, a shaft having mechanical connection with the steering wheel to be rotated thereby, a pair of levers mounted in parallel planes on said shaft, one lever being fixed to said shaft and the other being free thereon and positively connected to said motion transmitting means, a power device connected to said second named lever, means for utilizing turning movement of said shaft for effecting actuation of said power device, means for positively connecting said levers together for the manual actuation of the second named lever and of said motion transmitting means, and means constructed and arranged to be operable upon a given condition of said driving means for rendering said last named means operative.

34. In a steering mechanism for a motor vehicle having a steering wheel, motion transmitting means for transmitting steering movements to the dirigible wheels of the vehicle, and a driven shaft for propelling the vehicle, a rock shaft operable by the steering wheel, a pair of lever arms on said rock shaft, one fixed to said shaft and the other free thereon and positively connected to said motion transmitting means, said lever arms being constructed and arranged for limited relative turning movement, a power device having lost motion connection with the second named lever arm, a follow-up control mechanism for said power device operable in accordance with turning movement of the steering wheel and in accordance with movement of the second named lever arm, a device carried by one of said lever arms and movable to a first position for positively connecting said lever arms together for the manual actuation of said motion transmitting means, and being movable to a second position for positively connecting said power device to said second named lever arm, and means constructed and arranged to be operable when said driven shaft is rotating above a predetermined speed for moving said device to said first position.

35. In a steering mechanism for a motor vehicle having a steering wheel, motion transmitting means for transmitting steering movements to the dirigible wheels of the vehicle, and a transmission, a shaft rotatable by the steering wheel, a pair of levers mounted on said shaft, one fixed on said shaft and the other free thereon and positively connected to said motion transmitting means, said levers being constructed and arranged for limited relative turning movement, a fluid pressure motor having a movable element provided with lost motion connection with said second named lever, a follow-up control valve mechanism for said motor having a pair of elements one operable by the first named lever and the other in accordance with movement of the movable element of said motor, a device carried by one of said levers movable to one position for positively connecting said levers together for the manual actuation of said motion transmitting means, and movable to a second position for positively connecting the movable element of said motor to said second named lever, said device being biased to one of said positions, and means constructed and arranged for operation in accordance with gear ratio conditions in the transmission for moving said device to its other position.

36. In a steering mechanism for a motor vehicle having a steering wheel and motion transmitting means for transmitting steering movements to the dirigible wheels of the vehicle, a power device, means for controlling said power device by turning movements of the steering wheel, and means constructed and arranged for selectively connecting said motion transmitting means to either said power device or to the steering wheel.

37. In a steering mechanism for a motor vehicle having a steering wheel and motion transmitting means for transmitting steering movements to the dirigible wheels of the vehicle, a power device, means for controlling said power device by turning movements of the steering wheel, means constructed and arranged for selectively connecting said motion transmitting means to either said power device or to the steering wheel, and means operable when said power device is connected to said motion transmitting means for resisting turning movement of the steering wheel to a degree proportional to resistance encountered by said power device in operating said motion transmitting means.

38. In a steering mechanism for a motor vehicle having a steering wheel and motion transmitting means for transmitting turning movements to the dirigible wheels of the vehicle, a power device, a follow-up control mechanism for said power device for causing it to partake of a follow-up action with respect to the steering wheel upon movement thereof, motion transmitting connections between the steering wheel and said power device and said motion transmitting means, said motion transmitting connections including a control device for providing lost motion between the steering wheel and the motion transmitting means or between said power device and the motion transmitting means, and selectively operable means for rendering said control device operative for preventing lost motion between said motion transmitting means and either the steering wheel or said power device to provide for either manual or power steering.

39. In a steering mechanism for a motor vehicle having a steering wheel and motion transmitting means for transmitting turning movements to the dirigible wheels of the vehicle, a fluid pressure motor, a follow-up control valve mechanism for said motor for causing it to partake of a follow-up action with respect to the steering wheel upon movement thereof, motion transmitting connections between the steering wheel and said motor and said motion transmitting means, a device for providing lost motion between the steering wheel and the motion transmitting means or between said motor and the motion transmitting means, and selectively operable means for rendering said device operative for preventing lost motion between said motion transmitting means and either the steering wheel or said motor to provide for either manual or power steering.

GEORGE TUCKER SMITH.